United States Patent [19]
Kinoshita et al.

[11] 3,818,902
[45] June 25, 1974

[54] ENDOSCOPE ASSEMBLY HAVING ITS OPTICAL SYSTEM PROVIDED WITH A DIRECTION SHIFTER

[75] Inventors: Kunio Kinoshita; Mitsuto Itoh, both of Tokyo, Japan

[73] Assignee: Olympus Optical Co., Ltd., Tokyo, Japan

[22] Filed: June 30, 1972

[21] Appl. No.: 267,980

[30] Foreign Application Priority Data
July 3, 1971 Japan .............................. 46-49006

[52] U.S. Cl. .................................................. 128/6
[51] Int. Cl. .............................................. A61b 1/06
[58] Field of Search ................................. 128/6, 11

[56] References Cited
UNITED STATES PATENTS
3,548,808   12/1970   Takahashi et al. ..................... 128/6
3,608,547   9/1971   Sato ........................................ 128/6
3,703,169   11/1972   Ouchi ..................................... 128/6

Primary Examiner—Lucie H. Laudenslager
Attorney, Agent, or Firm—Kemon, Palmer & Estabrook

[57] ABSTRACT

An endoscope assembly wherein either or both of an illumination optical system associated with an illumination window formed near the outer end of an endoscope and an observation light transmitting optical system associated with an observation window formed near said outer end are equipped with a direction shifter for changing by operation of a control means the direction in which the illumination light is emitted and/or the observation light is received.

10 Claims, 8 Drawing Figures

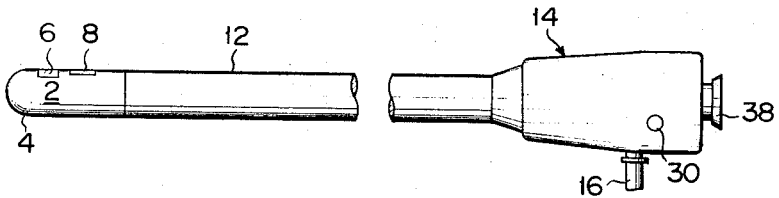
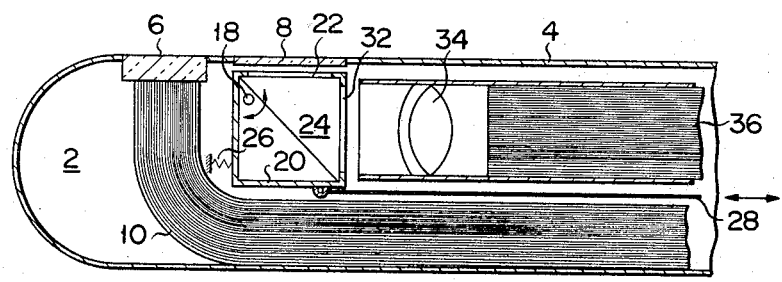
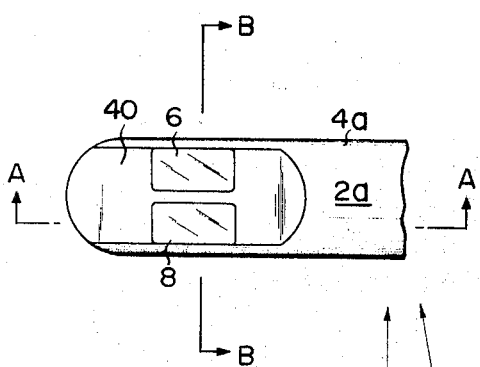
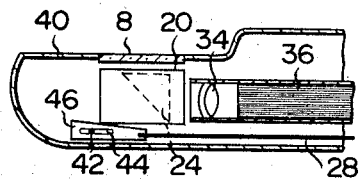
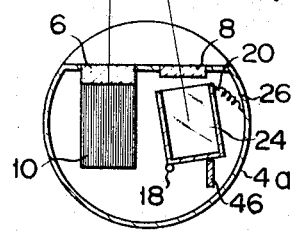

PATENTED JUN 25 1974  3,818,902

ENDOSCOPE ASSEMBLY HAVING ITS OPTICAL SYSTEM PROVIDED WITH A DIRECTION SHIFTER

BACKGROUND OF THE INVENTION

This invention relates to an endoscope assembly and more particularly a type having its optical system provided with a direction shifter.

The conventional endoscope assembly has an observation light transmitting optical system and illumination optical system received in that tubing of the assembly which is inserted into the body cavity and is further provided with an illumination window and observation window near the outer end of said tubing. Light conducted by the illumination optical system through the illumination window is directed to the walls of the body cavity. Reflection from the illuminated body cavity walls is brought through the observation window to the observation light transmitting optical system and then to an observation eyepiece located outside of the body cavity.

With the prior art endoscope assembly of the aforementioned arrangement, an illumination optical system for emitting illumination light and observation light transmitting optical system for receiving light projected from the body cavity walls are fixed in the endoscope. Unless, therefore, the endoscope has its position changed, the direction is always fixed in which the illumination light is cast and/or the observation light is received. Moreover, it is impossible to vary the position of the endoscope exactly as desired by external operation. Further, since the illumination and observation optical systems are arranged at a fixed relative angle, the distance of the illumination and observation windows from the body cavity walls has to be accurately defined for proper observation. If said distance varies, observation will sometimes be impossible. For this reason, the conventional endoscope assembly has the drawbacks that its operation consumes a great deal of time and accurate observation is difficult.

It is accordingly the object of this invention to provide an endoscope assembly permitting accurate observation by simple operation.

SUMMARY OF THE INVENTION

According to an aspect of this invention, there is provided an endoscope assembly having its optical system equipped with a direction shifter for varying the direction in which illumination light is emitted and/or observation light is received, thereby always attaining accurate observation.

BRIEF DESCRIPTION OF THE DRAWINGS

FIG. 1 schematically presents the external appearance of an endoscope assembly according to an embodiment of this invention;

FIG. 2 is a longitudinal sectional view of FIG. 1;

FIG. 3A is a plan view of an endoscope assembly according to another embodiment of the invention;

FIG. 3B is a longitudinal sectional view on line A—A of FIG. 3A;

FIG. 3C is a cross sectional view on line B—B of FIG. 3A;

DESCRIPTION OF THE PREFERRED EMBODIMENTS

Figure 4:
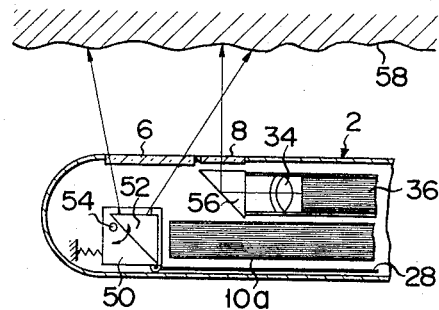
FIG. 4 is a longitudinal sectional view of an endoscope assembly according to still another embodiment of the invention.

Referring to FIG. 1, a metal cylinder 4 constituting an endoscope 2 has an illumination window 6 and observation window 8 arranged near the outer end of the cylinder in the axial direction thereof. These windows 6 and 8 are formed of transparent material. To the backside of the illumination window is bonded, as shown in FIG. 2, one end face of a bundle 10 of optical fibers constituting an illumination optical system. The other end of said bundled optical fibers 10 passes through a flexible connection tube 12 (FIG. 1) attached to the metal cylinder 4 to be connected to an illumination light inlet tube 16 attached to the external light source of a control means 14. Referring to FIG. 2, there is provided inside the observation window 8 a prism support frame 20 pivotally fitted by a pin 18 at one corner. In that side of the frame 20 which faces the observation window 8 is formed an opening 22. Said frame 20 contains a prism 24 constituting part of an observation light transmitting optical system. The frame 20 is normally biased to rotate clockwise about the pin 18 by means of a spring 26, but is kept at rest at a point displaced through a proper angle from its otherwise rotatable position by a wire 28 so fitted at one end to the frame 20 as to be moved against the force of the spring 26. The other end of the wire 28 passes through the connection tube 12 to the control means 14 and is fixed to an adjustment knob 30. Light received through the observation window 8 via the aforesaid opening 22 and reflected by the prism 24 enters an object lens 34 through another opening 32 formed in the frame 20. There is provided another bundle 36 of optical fibers for transmitting observation light with its end face disposed exactly at the focal point of said object lens 34. The other end of the optical fiber bundle 36 passes through the connection tube 12 to the observation eyepiece 38 (FIG. 1) of the control means 14.

The endoscope 2 fitted to the outer end of the connection tube 12 is inserted into the desired spot of the cavity of a human body. Illumination light from the source is introduced through the illumination light inlet port 16 of the control means 14, passes through the optical fiber bundle 10 and emitted through the illumination window 6 to the body cavity walls. Reflection therefrom passes through the observation window 8 and the opening 22 of the frame 20 to be reflected by the prism 24, causing the image of the body cavity walls to be focused by the object lens 34 on one end face of the optical fiber bundle 36. Said image is conducted through said bundle 36 to the eyepiece 38 of the control means so as to be observed by the naked eye or picked up by a camera.

Where reflection bearing the image of the body cavity walls does not properly enter the observation window 8 but is somewhat displaced therefrom, then the adjustment knob 30 is rotated while making observation through the eyepiece 38 to cause the prism support frame 20 to be turned about the pin 18 in order to change the incidence angle of light introduced into the prism 24. Thus the prism 24 constituting part of the observation light transmitting optical system has its position changed always to attain accurate observation.

The foregoing embodiment relates to the so-called sidewise observation type endoscope wherein the illumination window 6 and observation window 8 are arranged in series lengthwise of the cylinder 4. However, this invention is also applicable to another sidewise observation type of endoscope wherein the illumination window 6 and observation window 8 are provided parallel lengthwise of the cylinder 4a as illustrated in FIGS. 3A, 3B and 3C. The parts of FIGS. 3A, 3B and 3C the same as those of FIG. 2 are denoted by the same numbers. According to the embodiment represented by these fingers, the cylinder 4a of the endoscope 2a is provided on one side with a flat portion 40 in which the illumination window 6 and observation window 8 are formed parallel as shown in FIG. 3A. The illumination window 6 and optical fiber bundle 36 constituting the illumination optical system are made of the same materials as those of FIG. 2. The frame 20 supporting the prism 24 constituting the observation light transmitting optical system is pivotally supported, as illustrated in FIG. 3C, by the pin 18 disposed at one end of the underside. At the other end of the underside of the frame 20 is provided, as indicated in FIG. 3B, a wedge-shaped member 46 bored with a guide hole 44 through which a guide pin 42 travels. This wedge-shaped member 46 is connected to the adjustment knob 30 of the control means 14 (not shown) formed like that of FIG. 1 by a wire 28 connected to one end of said wedge-shaped member 46.

According to the embodiment of FIG. 3, the incidence angle of observation light entering the prism 24 is controlled by moving the wedge-shaped member 46 over the underside of the frame 20 in the axial direction of the cylinder 4a either to the left side of FIG. 3B for the clockwise rotation of the prism 24 or to the right side of FIG. 3B for its counterclockwise rotation.

The two aforesaid embodiments are intended to vary the position of the observation light receiving prism 24. However, the angle at which the illumination light is emitted may also be changed. FIG. 4 presents an embodiment designed for this purpose. A frame 50 is disposed close to the end face of a bundle 10a of optical fibers constituting part of an illumination optical system, and a prism 52 is supported on the frame 50, which rotates about a pin 54 and is connected at one end to the wire 28 which in turn is connected, as in FIG. 1, to the adjustment knob 30 of the control means 14. In the embodiment of FIG. 4, a prism 56 constituting an observation light transmitting optical system is fixed to the endoscope 2. Rotation of the prism 52 enables illumination light passing through the optical fiber bundle 10a to be emitted at varying angles through the illumination window 6 to the body cavity walls 58.

Figure 5:
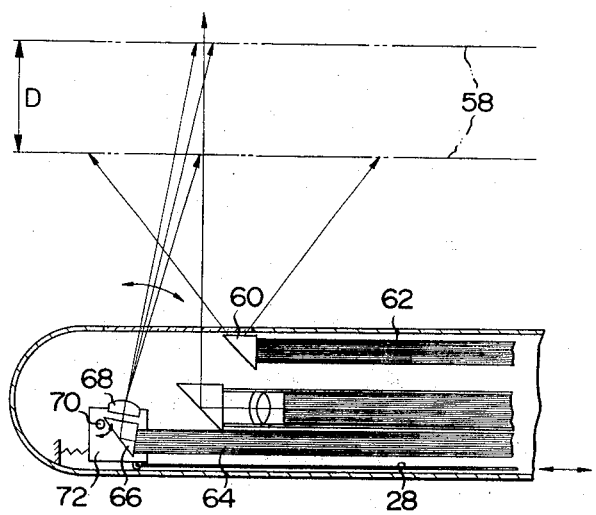
FIG. 5 is a longitudinal sectional view of an endoscope assembly according to a further embodiment of the invention.

Further, an illumination optical system comprises, as shown in FIG. 5, a broad illumination optical system consisting of a prism 60 and a bundle 62 of optical fibers and a spot illumination optical system formed of a bundle 64 of optical fibers, prism 66 and convex lens 68. This combination of optical systems is intended to supplement a possible shortage of illumination light being cast on the body cavity walls, in case observation is carried out by a special means, for example, a telescopic or zoom lens. In the embodiment of FIG. 5, the spot illumination optical system has a limited range of illumination, requiring the angle of light reflection to be adjusted by accurately varying the position of a prism 66. To this end, the prism 66 is attached to the end face of the optical fiber bundle 64, a frame 72 is so fitted as to rotate about a pin 70, and spot illumination light is emitted from the prism 66 to the body cavity walls 58 at varying angles by operating, as in FIG. 1, the adjustment knob 30 of the control means 14. This arrangement effects good observation even where the body cavity walls 58 are removed from an endoscope for a distance D.

Figure 6:
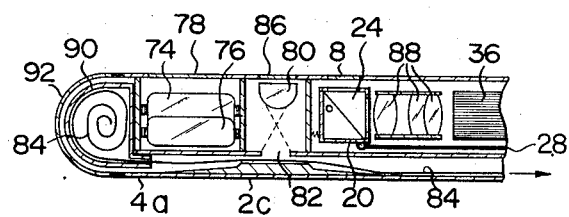
FIG. 6 is a longitudinal side view of an endoscope assembly according to a still further embodiment of the invention.

The aforementioned embodiments of FIGS. 1 to 5 relate to the case where illumination light was introduced into an endoscope 2 or 2a from the external control means 14 through optical fibers as a light guide. However, a source of illumination light may be received in an endoscope itself as illustrated in FIG. 6. There will now be described this embodiment by reference to the case where there is fitted a direction shifter to an observation light transmitting optical system. FIG. 6 illustrates an endoscope 2c in which there is housed a source of illumination light. The connection tube and control means of FIG. 6 are constructed and operated in the same manner as in FIG. 1. An endoscope 2c according to the embodiment of FIG. 6 has three openings: a first is an illumination window 78 through which to emit illumination light from a photographic lamp 76; a second is a photographic window 86 through which to conduct reflection from the body cavity walls from a photographic lens 80 to a photographic film 84 placed in a photograhpic frame 82; and a third is an observation window 8 through which to transmit observation light, as in FIG. 2, to the prism 24 mounted on the pivotally fitted frame 20 controlled by the wire 28, a group 88 of object lenses and a bundle 36 of optical fibers. The photographic film 84 is received in a film cassette 90 and has its takeup end connected to the film takeup lever (not shown) fitted to, for example, the control means 14. The film cassette 90 is detachably fitted by means of a cap 92 screwed to the outer end of the cylinder 4a. Lamps 74 and 76 are connected to separate external power supply sources by lead lines (not shown) extending from the control means 14 through the connection tube and endoscope 2 to said sources.

There will now be described the operation of the endoscope 2c arranged as shown in FIG. 6. First, the observation lamp 74 is lighted, and while observing the body cavity walls with an eyepiece fitted to the control means 14, the endoscope 2c is drawn near a desired spot on the body cavity walls. If required, photographing may be made using the film 84. At this time, the observation lamp 74 is put off after the endoscope 2 is brought to rest in a desired position. The film 84 is rolled by one frame and the photographic lamp 76 is lighted for a prescribed length of time for exposure of the film. Then the film 84 is rolled by another frame and the observation lamp 74 is lighted. Thus, the image of the body cavity walls is picked up on the alternate frames of the film 84.

What we claim is:

1. An endoscope assembly comprising a control means including an adjustment means, an endoscope member consisting of a connection tube attached to the control means, an illumination window through which to emit illumination light and an observation window through which to introduce observation light, both formed near the distal end of the endoscope, an illumination optical system associated with the illumination window, and an observation light transmitting optical system associated with the observation window; a direction shifter fitted to either of said optical systems for shifting the direction of the optical axis of either said optical systems; and a connection means for connecting the direction shifter to said adjustment means to vary, by means of said adjustment means, at least one of the directions in which the illumination light is emitted and the observation light is received.

2. The endoscope assembly according to claim 1 wherein the observation optical system comprises a first prism for reflecting observation light introduced through the observation window; an object lens for focusing light reflected by the first prism; and a first bundle of optical fibers having one end disposed at the focal point of the object lens and the opposite end drawn to the control means.

3. The endoscope assembly according to claim 2 wherein the direction shifter comprises means for supporting the first prism so as to rotate it to a prescribed position in the lengthwise direction of the endoscope; and means connecting said first prism to said adjustment means to adjust the angle through which the first prism is made to rotate.

4. The endoscope assembly according to claim 2 wherein the direction shifter comprises means for supporting the first prism so as to rotate it to a prescribed position across the endoscope; and means connecting said first prism to said adjustment means to adjust the angle through which the first prism is made to rotate.

5. The endoscope assembly according to claim 3 wherein said prism supporting means includes a frame pivotally supported by a pin at one end and normally urged in a prescribed direction by a spring; the control means includes an adjustment lever; and the adjustment means includes a wire connected at one end to the frame and at the other to the adjustment lever of the control means.

6. The endoscope assembly according to claim 4 wherein the prism supporting means includes a frame pivotally supported by a pin at one end and normally urged in a prescribed direction by a spring; the control means includes an adjustment lever; and the adjustment means includes a guide pin and a wedge-shaped member guided by said guide pin with its inclined surface so disposed as to abut against said frame and a wire connected at one end to said wedge-shaped member and at the other to the adjustment lever of the control means.

7. The endoscope assembly according to claim 1 wherein the illumination optical system includes a bundle of optical fibers through which to introduce illumination light from a source provided outside of the control means into the endoscope and a prism for reflecting illumination light delivered from the bundle of optical fibers and emitting said light to the outside through the illumination window; and the direction shifter includes a frame rotatably supporting the prism and normally urged in a prescribed direction by a spring, a wire having one end connected to said frame and the other end drawn to the control means and an adjustment knob fitted to the side of the control means and is connected to said other end of said wire.

8. The endoscope assembly according to claim 7 wherein the illumination optical system includes a second bundle of optical fibers through which to introduce illumination light supplied from a source disposed outside of the control means and a convex lens for focusing illumination light delivered from said second bundle of optical fibers and emitting it to the outside of the illumination window.

9. The endoscope assembly according to claim 1 wherein the illumination optical system has a light source received in the endoscope itself.

10. The endoscope assembly according to claim 9 wherein the source of light consists of an observation lamp and photographic lamp and there are received a photographic film fitting means and a photographic optical system for emitting light from the photographic lamp to the film.

* * * * *